United States Patent
Van Horssen

(10) Patent No.: US 7,153,069 B1
(45) Date of Patent: Dec. 26, 2006

(54) QUICK CHANGE HOLDER FOR CUTTING TOOL

(76) Inventor: Charles A. Van Horssen, 21622 N. 14th Ave., Phoenix, AZ (US) 85027

( * ) Notice: Subject to any disclaimer, the term of this patent is extended or adjusted under 35 U.S.C. 154(b) by 0 days.

(21) Appl. No.: 11/148,118

(22) Filed: Jun. 8, 2005

(51) Int. Cl.
B23P 15/28 (2006.01)
B23C 5/22 (2006.01)

(52) U.S. Cl. .......................... 407/111; 407/107; 407/91

(58) Field of Classification Search ............... 407/111, 407/107, 108, 109, 110, 91
See application file for complete search history.

(56) References Cited

U.S. PATENT DOCUMENTS

| | | | |
|---|---|---|---|
| 3,838,500 A | 10/1974 | Wirfelt | |
| 3,981,607 A | 9/1976 | Jorgensen | |
| 4,210,038 A | 7/1980 | Hill | |
| 4,420,280 A | 12/1983 | Gustafson | |
| 4,596,502 A | 6/1986 | Cattani | |
| 4,655,631 A | 4/1987 | Mitchell | |
| 4,682,521 A | 7/1987 | Duenas | |
| 4,697,963 A * | 10/1987 | Luck | 407/105 |
| 4,736,659 A | 4/1988 | Erickson | |
| 4,875,397 A | 10/1989 | Berdichevsky | |
| 5,040,932 A | 8/1991 | Oshnock | |
| 5,560,271 A | 10/1996 | Duty | |
| 5,683,212 A | 11/1997 | Cirino et al. | |
| 6,835,028 B1 | 12/2004 | Usui et al. | |

FOREIGN PATENT DOCUMENTS

WO   WO89/02327   3/1989

* cited by examiner

Primary Examiner—Willmon Fridie, Jr.
(74) Attorney, Agent, or Firm—Frank J. McGue

(57) ABSTRACT

A quick change tool holder is provided for cutter inserts on machine tools which comprises a housing which is adapted to receive and conform to the shape of a cutter insert. A pivoting arm is mounted in the insert housing and rotates about a pivot therein. The pivoting arm has a clamp portion extending from the pivot to a position over a seat portion which is adapted to engage a cutter insert. In addition, the pivoting arm has an arm extending from the pivot opposite the clamp portion. Lastly, a cam is engaged by a distal end of the arm. The cam has a clamp position which forces the clamp portion to engage a cutter insert and a release position which forces the clamp portion to disengage from a cutter insert to allow thereof. The cam moves between the release position and the clamp position.

10 Claims, 3 Drawing Sheets

QUICK CHANGE HOLDER FOR CUTTING TOOL

TECHNICAL FIELD

This invention relates generally to the field of tool holders, and, more particularly, to an improved tool holder providing the ability to quickly change cutting tools as needed in machine shops.

BACKGROUND OF THE INVENTION

In the metal cutting or machining industry, metals and other hard materials are made into a desired finished shape by various cutting operations. The cutting tools used in the industry have sharp edges and are manufactured from materials that are much harder than those being cut. However, the forces involved in cutting metals and other hard materials are very large and thus the cutting tools and the materials being cut must be held extremely securely with a very high degree of rigidity. In addition, the geometry of the cutting edges of said tools is very broad and strong when compared, for example, to the edge of a knife blade. This very broad edge also further increases the cutting forces required.

There are two general modes of cutting that are performed in the industry. The first is external cutting where material is removed from the exterior surfaces of the raw material or part to be machined. An analogous cutting technique would be peeling an apple.

The second cutting mode in internal cutting where material is removed from surfaces which are surrounded by the material itself such as drilling a hole. Carrying the analogy further, an example of internal cutting is coring the apple.

There are also two general types of machining techniques employed in the industry which can be used for either cutting mode. In the first technique, the material to be machined (hereinafter the "workpiece"), is rotated rapidly and continuously in a lathe spindle. The cutting tool is brought into contact with the rotating workpiece causing removal of material. This technique is known in the industry as turning and the modern lathe is called a turning center.

In the second technique, the workpiece is rigidly held in a fixed position and rapidly rotating cutting tools are brought into contact therewith thereby causing material to be removed. This technique is known as milling and the machine is a milling machine. However, modern machine tools often have both milling and turning capabilities in the same machine. Such dual capable machines are called machining centers.

There are three general shapes of tools in use today. The first shape is the drill and related hole making tools such as reamers and boring bars. Some of the larger tools in this category use inserts described below, but much of the hole making tooling is made from solid materials. Hole making tools are solely used in the internal cutting mode.

The second shape is an end mill which is essentially a short stout drill that cuts with its sides. End mill tools are used in mills or machining centers and can cut in either the internal cutting or external cutting modes. Larger diameter end mills may use inserts as described below.

The last and most common shape is the insert tool. Inserts are commonly made from, or coated with, very hard materials such as silicon carbide, ceramic or even diamond. Inserts are made in small flat pieces in the shape of rhomboids, circles, triangles or other polygons. Inserts are often provided with a hole in the center thereof that allows them to be fitting into holders and secured therein with clamps and screws.

As metal cutting proceeds, the insert will wear down and must be periodically replaced with another identical insert. Often times, inserts will have more than one cutting edge or tip that can be used. Thus, the insert can be flipped over, or rotated, or both to bring another tip into use. A square or rhomboid insert can have up to eight tips that can be used until the insert is discarded. While inserts are almost never sharpened for reuse, the inserts are recycled for their cobalt content. In contrast, the insert holder is generally reusable forever.

At present, all insert changes must be performed manually. Since most inserts are held in place with two different sized allen screws, it takes a relatively long time to change an insert. There is no automated technique for replacing or realigning such inserts. The operator must be highly skilled to properly change or realign said insert and, conversely, this skill level leads to frequent incorrect installations. Such incorrect installations can lead to significant scrap losses. In addition, both the screws holding said inserts and the threaded holes receiving said screws wear or strip out. As a consequence, operators of insert equipped machinery simply do not like to change inserts.

There have been some attempts to address these issues. U.S. Pat. No. 5,683,212 entitled "Clamping Assembly for Tapered Hollow Shank of Tooling System" which issued on Nov. 4, 1997 to Cirino et al. discloses a clamping assembly for a cutter holder tool which includes a button 40 which clamps against a tapered shank so that said tool is urged inwardly by a spring (not shown) seated on the reduced diameter land 60.

U.S. Pat. No. 4,420,280 entitled "Tool Block" which issued on Dec. 13, 1983 to Gustafson shows a tool block for a lever actuated quick release mechanism which is provided with a cutting insert holder 12 and a clamping device comprised of a pivotally arranged lever 20, one end of which acts on the cutting insert holder 12 while the other end of which cooperates with a spring loaded device 21.

U.S. Pat. No. 3,981,607 entitled "Boring Bar with Removable and Indexable Cutting Insert" which issued on Sep. 21, 1976 to Jorgensen has a manual button 100 release mechanism for a cutting insert 12 which may be removed by releasing the pressure applied to the finger 28 through the clamp insert 14 by means of a manual button 100 which, when depressed, will contact the forward end 83 of the wedge shaft 74 thereby forcing the wedge shaft 74 to the right causing the ball 84 and the clamp release pin 60 to drop down.

U.S. Pat. No. 4,210,038 entitled "Lathe Having a Guided Movable Cutter" which issued on Jul. 1, 1980 to Hill provides a cutting tool holder which includes vertical positioning knob 17 and a coarseness selector handle 17 for adjusting the positioning of the cutter holder.

None of the known prior art disclose the combination set forth herein.

SUMMARY OF THE INVENTION

It is an object of this invention to provide an improved holder for quick changes of cutter inserts.

It is a further object of this invention to provide an improved holder which requires no tools or screws for securing or removing a cutter insert.

It is still another object of this invention to provide an improved holder which is designed for manual operation but is capable of being automated.

It is an object of this invention to provide an improved holder for cutting inserts which reduces scrap by not closing if incorrect installation.

It is still another object to provide an improved holder for cutting inserts which can be changed in seconds.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
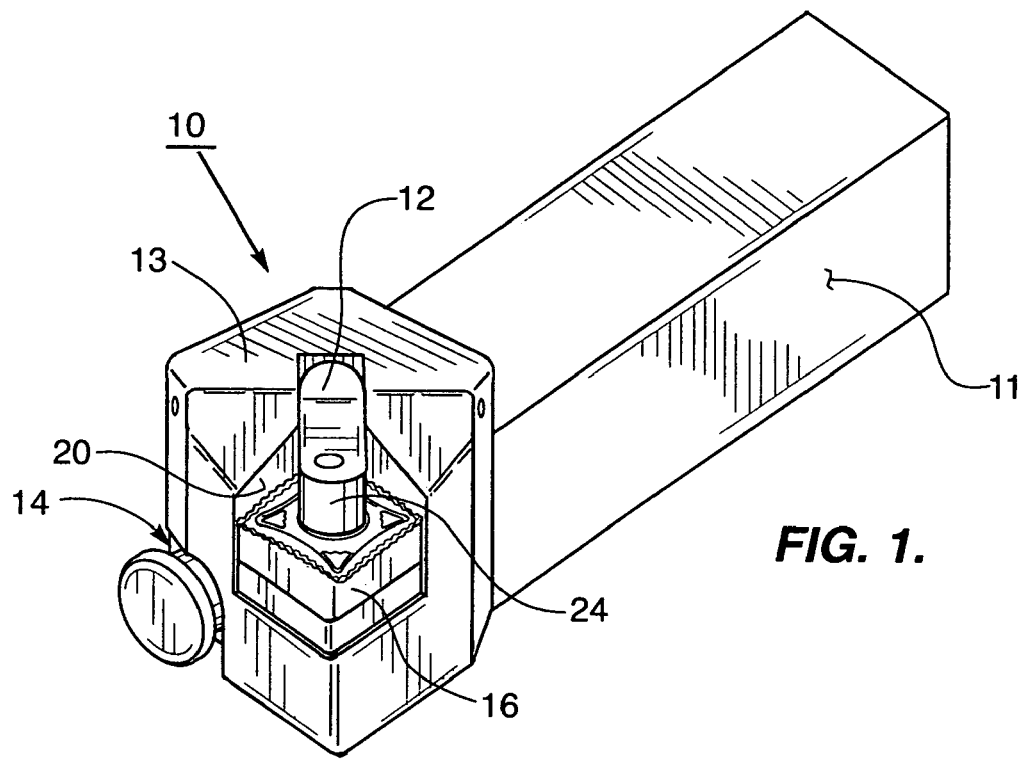
FIG. 1 is a perspective view of the present invention with a cutter insert installed.
Figure 2:
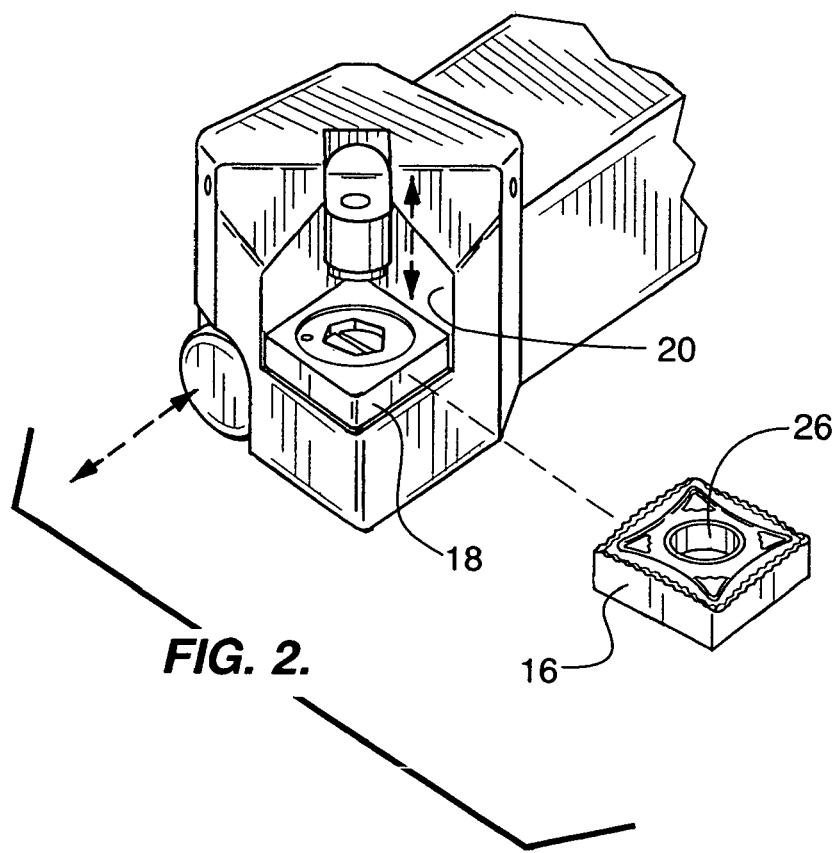
FIG. 2 is a perspective view of the present invention with the cutter insert removed.
Figure 3:
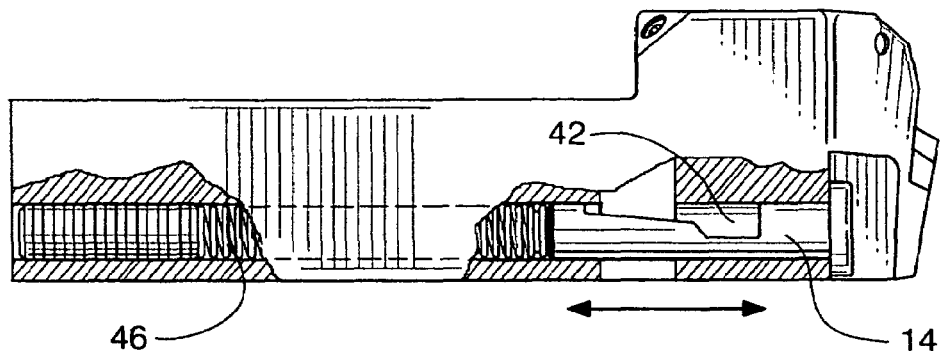
FIG. 3 is a partial cross sectional side view of the present invention showing a cam.

Referring more particularly to the drawings by characters of reference, FIGS. 1–3 disclose combinations of features which constitute the components of a quick change tool holder 10 which comprises a mounting arm 11 having a cutter insert housing 13 mounted at one end of said mounting arm. Tool holder 10 further comprises a pivoting arm 12 and cam 14 to speed the process of changing a cutter insert 16.

Figure 12:
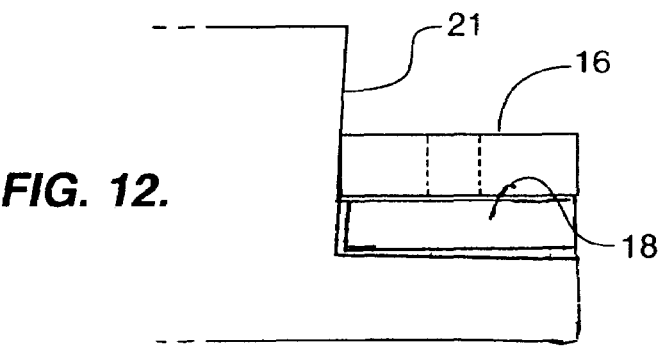
FIG. 12 is a side view of a cutout bench used in the present invention.
Figure 5:
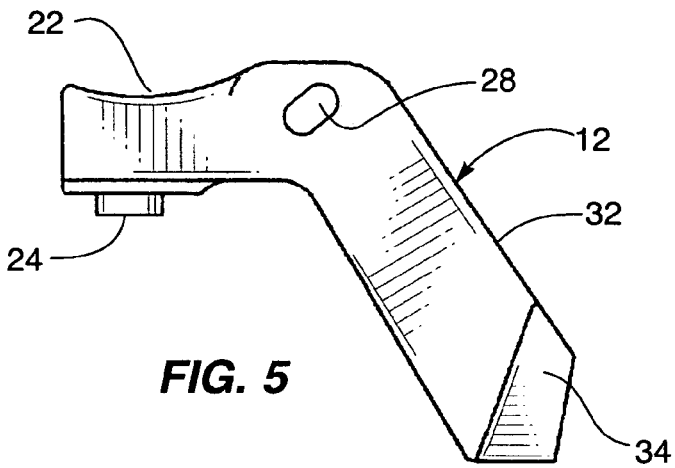
FIG. 5 is a side view of the pivoting arm.
Figure 6:
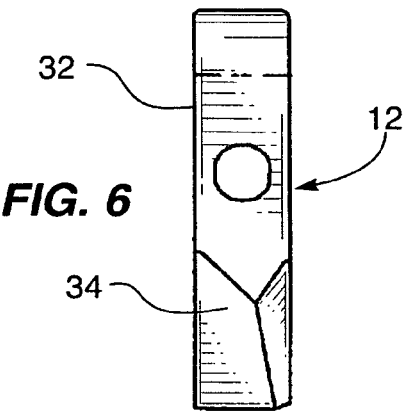
FIG. 6 is a rear view of the pivoting arm.
Figure 7:
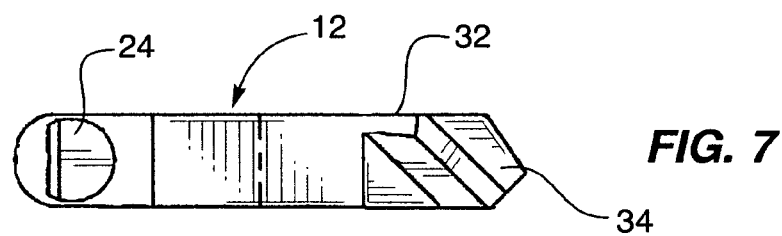
FIG. 7 is a bottom view of the pivoting arm.
Figure 8:
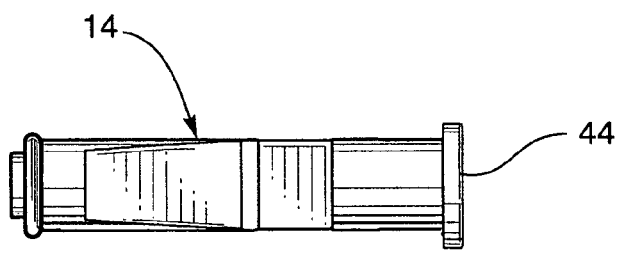
FIG. 8 is top view of the cam.
Figure 9:
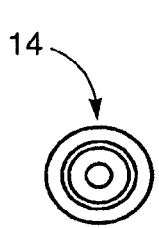
FIG. 9 is a rear view of the cam.

In this example, cutter insert 16 is has a rhomboid cross section. To accommodate cutter insert 16, cutter insert housing 13 includes a seat portion 18 positioned in a cutout bench 20 which receives and conforms to the shape of cutter insert 16. Seat portion 18 is shown in as a separate piece but may, in fact, be integrally formed with insert housing 13. As discussed previously, cutter insert 16 can have a multiplicity of shapes. Those skilled in the art will recognize that the present invention is not limited to the illustrated shapes and sizes, but such are exemplary in nature only. In addition, as best seen in FIG. 12, cutout bench 20 includes sidewalls 21 which slope inwardly towards the top of insert 16.

Figure 4:
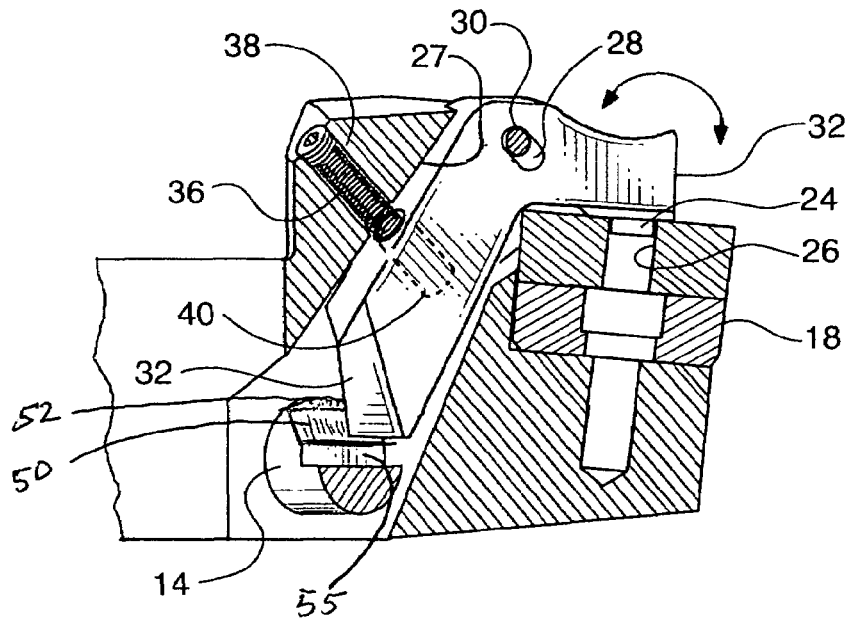
FIG. 4 is a cross sectional view of a pivoting arm engaging the cutter insert.

Pivoting arm 12 is mounted in a pivoting arm slot 27 in insert housing 13. Pivoting arm 12 includes an elongated hole 28 through which a pivoting axle 30 extends to allow rotation of pivoting arm 12 thereabout from a clamping position shown in FIGS. 1 and 4 to a release position shown in FIG. 2. Pivoting arm 12 has a clamp portion 22 which extends from said elongated hole out of pivoting arm slot 27 to a position over seat portion 18 and cutter insert 16. A pin member 24, in the illustrated embodiment having a semicircular profile, extends from clamp portion 22 towards cutter insert 16 and mates with a corresponding hole 26 in cutter insert 16. Use of pin member 24 is also preferred as often cutter inserts 16 are mounted in an inverted position and simply fall to the ground once released. Using the present invention, inverted cutter inserts 16 are held in place by pin member 24 to allow the operator to easily grasp for removal. Additionally, the inwardly sloping sidewalls 21 provide a slight downward force on insert 16 when insert 16 is pulled towards bench 20 by pin member 24.

Those skilled in the art will recognize that the exact profile and shape of pin member 24 is not limited to the semicircular profile depicted in the drawings, but other shapes such as circular are certainly within the scope of the present invention.

When pin member 24 is engaged with cutter insert 16, elongated hole 28 is pitched at an angle whereby pivoting arm 12 is pulled inwards by about half the clamping force thereby seating cutter insert 16 firmly in a clamped position. Extending at an angle from elongated hole 28 into pivoting arm slot 27 opposite clamp portion 22 is an arm 32 whose distal end 34 of pivoting arm 12 rests upon cam 14.

Pivoting arm 12 is biased to the release position by a pivoting arm compression spring 36 which is mounted into a channel 38 formed in insert housing 13 and aligned with a corresponding channel 40 in arm 32. Pivoting arm compression spring 36 is positioned to engage arm 32 between elongated hole 28 and distal end 34.

Cam 14 is generally a linear cylindrical profile which is mounted into insert housing 13 in a cam cavity 42. A button 44 is positioned outside cam cavity 42 at one end of cam 14. The other end of cam 14 engages a cam spring 46 which is a compression spring positioned in cam cavity 42 opposite button 44. Cam cavity 42 and pivoting arm slot 27 are connected within insert housing 13 whereby distal end 34 of pivoting arm 12 rests upon cam 14.

Figure 10:
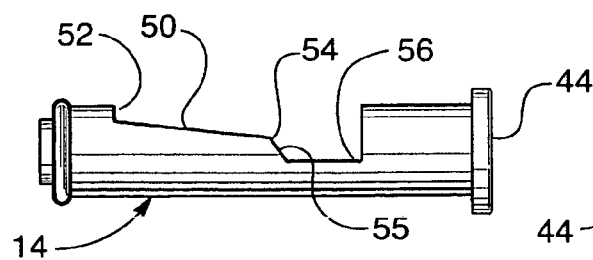
FIG. 10 is a side view of the cam.
Figure 11:
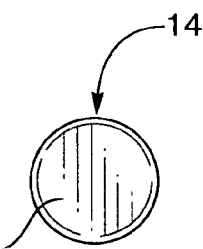
FIG. 11 is a front view of the cam.

As best seen in FIGS. 3 and 10, intermediate between button 44 and cam spring 46, cam 14 includes a sloped portion 50 which slopes inwardly from a shallow cut 52 proximate to cam spring 46 to a deeper cut 54 in the direction of button 44. A trough 56 extends further into cam 14 from deeper cut 54 proximate to and towards button 44.

Cam spring 46 biases cam 14 towards button 44 whereby distal end 34 rests upon sloped portion 50. Sloped portion 50 rotates pivoting arm 12 to the clamp position and holds at that position. This metal to metal push results in a firm clamp position by elimination of any give or spring in the design thereof.

To change from the clamp position to the release position, button 44 is pushed firmly toward insert housing 13 which pushes cam 14 inwards against a cam spring 46. Distal end 34 of pivoting arm 12 moves from sloped portion 50 to drop into trough 56 via a sharp drop off 55. When distal end 34 reaches trough 56, cam 14 is in a fully disengaged position which allows pivoting arm 12 to drop to the release position, said rotation being assisted by the pivoting arm compression spring 36. As noted previously, pivoting arm compression spring 36 holds pivoting arm 12 in the release position thereby allowing the user to simply remove old cutter insert 16 and replace with a new cutter insert 16 (or simply rotate old insert to bring a new cutting surface to bear).

It should also be noted that such the use of trough 56 fall off holds the clamp portion far enough away to allow easy removal of same and also now biases the device to the removal position for "hands free" operation. Further, if pin member 24 does not engage hole 26 fully, from either poor positioning or dirt or debris in hole 26, distal end 34 cannot be lifted to clear trough 56 whereby quick change tool holder 10 remains in the release position thereby warning the operator of an unsafe or improper condition. Also, the steepness of drop off 55 controls the force needed to return to the clamp position.

To return to the clamp position, the user simply presses downwardly on clamp portion 22. The resistance of pivoting arm compression spring 36 is overcome and distal end 34 of pivoting arm 12 re-engages the sloped portion 50 of cam 14 to push, with assistance from cam spring 46. Cam 14 is then back to a fully clamped position for cutter insert 16 use. The force needed to return to the clamp position is controlled by the angle of drop off 55. In some usages, for example, very high horsepower, small angles are desired whereby the operator must operate button 44 prior to, and while pressing downwardly on clamp portion 22 to reengage to reduce jamming caused by small angles.

Although only certain embodiments have been illustrated and described, it will be apparent to those skilled in the art that various changes and modifications may be made therein without departing from the spirit of the invention or from the scope of the appended claims. For example, the present discussion relates to cam 14 being a linear movement. Those skilled in the art will recognize that such cams can also be a rotary configuration.

What is claimed is:

1. A self contained, toolless quick change tool holder for cutter inserts on machine tools, the quick change tool holder comprising:
    a housing having a seat portion which is adapted to receive and conform to the shape of a cutter insert,
    a pivoting arm mounted in a pivoting arm slot in the insert housing, the pivoting arm rotating about a pivot in the insert housing, the pivoting arm having a clamp portion extending from the pivot to a position over the seat portion, the clamp portion adapted to engage a cutter insert, the pivoting arm having an arm extending from the pivot opposite the clamp portion, and
    a cam, the arm having a distal end engaging the cam, the cam having a clamp position which forces the clamp portion of the pivoting arm to engage a cutter insert, the cam having a release position which forces the clamp portion to disengage from a cutter insert to allow removal and replacement of same, the cam being manually movable between the release position and the clamp position without the use of tools.

2. The self contained, toolless quick change tool holder of claim 1 wherein the cutter insert housing is mounted at one end of a mounting arm.

3. The self contained, toolless quick change tool holder of claim 1 wherein the pivot is an elongated hole through which a pivoting axle extends to allow rotation of the pivoting arm the clamping position to the release position, the elongated hole being pitched at an angle whereby the pivoting arm is pulled slightly to seat a cutter insert when in a clamped position.

4. The self contained, toolless quick change tool holder of claim 1 wherein the clamp portion includes a pin member extending therefrom which is adapted to mate with a corresponding hole in a cutter insert.

5. The self contained, toolless quick change tool holder of claim 4 wherein the pin member has a semicircular profile.

6. The self contained, toolless quick change tool holder of claim 1 wherein the pivoting arm is biased to the release position by a pivoting arm compression spring which is mounted into a channel formed in insert housing and aligned with a corresponding channel in the arm, the corresponding channel being positioned between the pivot and the distal end of the arm.

7. A self contained, toolless quick change tool holder for cutter inserts on machine tools, the quick change tool holder comprising:
    a housing having a seat portion which is adapted to receive and conform to the shape of a cutter insert,
    a pivoting arm mounted in a pivoting arm slot in the insert housing, the pivoting arm rotating about a pivot in the insert housing, the pivoting arm having a clamp portion extending from the pivot to a position over the seat portion, the clamp portion adapted to engage a cutter insert, the pivoting arm having an arm extending from the pivot opposite the clamp portion, and
    a cam, the arm having a distal end engaging the cam, the cam having a clamp position which forces the clamp portion of the pivoting arm to engage a cutter insert, the cam having a release position which forces the clams portion to disengage from a cutter insert to allow removal and replacement of same, the cam movable between the release position and the clamp position, the cam including a button at one end and a cam spring opposite said button, the cam spring biasing the cam to the clamp position.

8. The self contained, toolless quick change tool holder of claim 7 wherein the cam includes, intermediate between the button and the cam spring, a sloped portion which slopes inwardly from a shallow cut proximate to cam spring to a deeper cut in the direction of the button, the cam further including a trough connected to the sloped portion by a drop off having a predetermined angle, the trough extending further into the cam from the deeper cut proximate to and towards the button, the cam spring biasing the cam towards the button whereby the distal end rests upon the sloped portion which rotates the pivoting arm to the clamp position, the predetermined angle controlling the force needed to move from the release position to the clamp position.

9. The self contained, toolless quick change tool holder of claim 8 wherein pushing the button toward the insert housing which pushes the cam inwards against the cam spring whereby the distal end of the pivoting arm moves from the sloped portion to the trough which allows the pivoting arm to rotate to the release position and whereby pressing downwardly on the clamp portion overcomes the bias of the pivoting arm to the release position to allow the distal end to again engage the sloped portion in the clamp position.

10. A self contained, toolless quick change tool holder for cutter inserts on machine tools, the quick change tool holder comprising:
    a housing having a seat portion which is adapted to receive and conform to the shape of a cutter insert, the housing being mounted at one end of a mounting arm,
    a pivoting arm mounted in a pivoting arm slot in the insert housing, the pivoting arm rotating about a pivot in the insert housing, the pivot being an elongated hole through which a pivoting axle extends to allow rotation of the pivoting arm between a clamp position to a release position, the elongated hole being pitched at an angle whereby the pivoting arm is pulled slightly to seat a cutter insert when in the clamp position, the pivoting arm having a clamp portion extending from the pivot to a position over the seat portion, the clamp portion including a pin member with a semicircular profile extending therefrom which is adapted to mate with a corresponding hole in a cutter insert, the pivoting arm having an arm extending from the pivot opposite the clamp portion, the pivoting arm being biased to the release position by a pivoting arm compression spring which is mounted into a channel formed in insert housing and aligned with a corresponding channel in the arm, the corresponding channel being positioned between the pivot and the distal end of the arm, and a cam, the cam including a button at one end and a cam spring opposite said button, the cam having positioned intermediate between the button and the cam spring, a sloped portion which slopes inwardly from a shallow cut proximate to the cam spring to a deeper cut in the direction of the button, the cam further including a trough which extends further into the cam from the deeper cut proximate to and towards the button, the trough connected to the deeper cut by a drop off having a predetermined angle, the cam spring biasing the cam towards the button whereby the distal end rests upon the sloped portion which rotates the pivoting arm to the clamp position, the arm having a distal end engaging the cam, wherein moving the button toward the insert housing pushes the cam inwards against the cam spring whereby the distal end of the pivoting arm moves from the sloped portion to the trough which allows the pivoting arm to rotate to the release position and whereby pressing downwardly on the clamp portion overcomes the bias of the pivoting arm to the release position to allow the distal end to again engage the sloped portion in the clamp position, the predetermined angle controlling the force needed to move from the release position to the clamp position.

\* \* \* \* \*